S. B. DRINKHOUSE.
SIPHON.
APPLICATION FILED APR. 23, 1912.
1,088,973.
Patented Mar. 3, 1914.
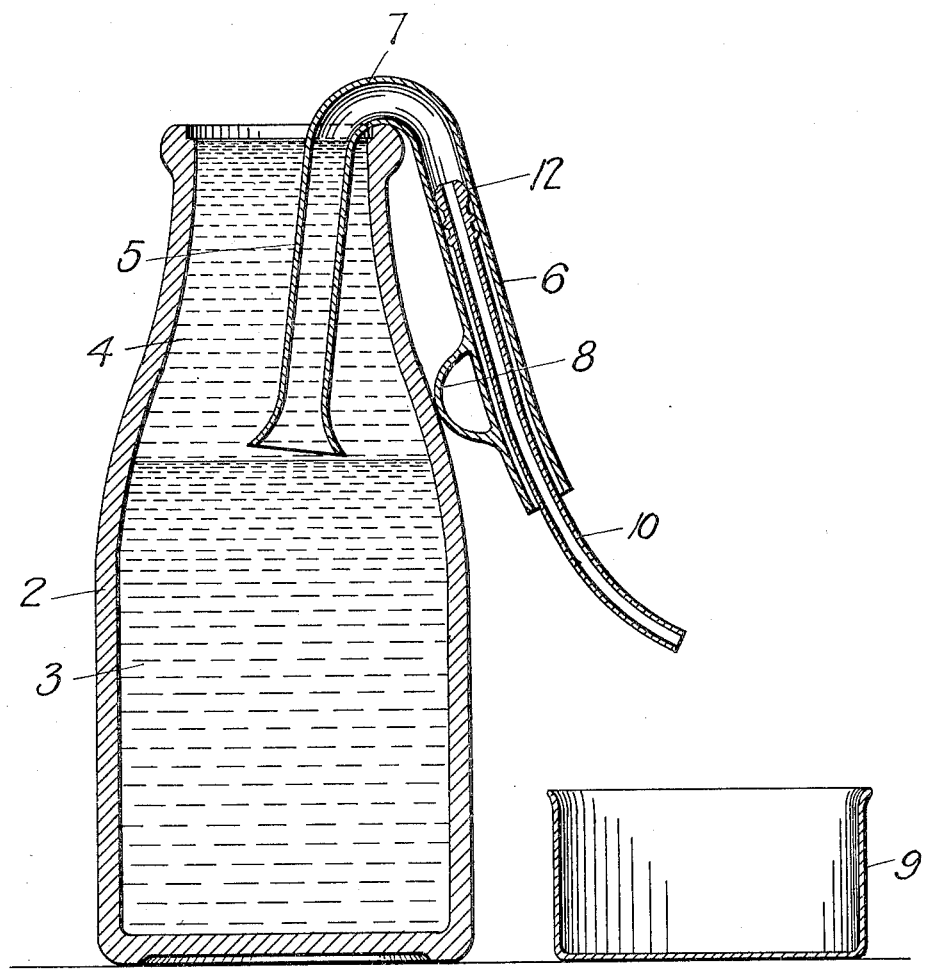
WITNESSES:
F. H. Cuno.
L. Rhoades
INVENTOR.
S. B. DRINKHOUSE
BY
ATTORNEY.

UNITED STATES PATENT OFFICE.

SAMUEL B. DRINKHOUSE, OF DENVER, COLORADO.

SIPHON.

1,088,973.  Specification of Letters Patent.  Patented Mar. 3, 1914.

Application filed April 23, 1912.  Serial No. 692,612.

*To all whom it may concern:*

Be it known that I, SAMUEL B. DRINK-HOUSE, a citizen of the United States, residing at Denver, in the county of Denver and State of Colorado, have invented certain new and useful Improvements in Siphons, of which the following is a specification.

My invention relates to siphons of the type particularly adapted to be employed in separating cream from milk contained in one of the bottles commonly used by milk-venders when delivering their wares.

The principal object of my invention resides in the provision of a siphon of very simple construction which, briefly, consists of a bent conduit preferably made of glass and having legs of unequal length, and a plunger-member composed of an open-ended flexible tube which at one of its ends is exteriorly enlarged to provide a piston which in practice, is slidably fitted within one of said legs.

Another object of my invention resides in the provision of means which when the siphon is placed in its proper position over the rim of a milk bottle will separate the exterior leg of the bent conduit from the surface of the bottle, a sufficient distance to direct the flow of liquid discharged through the orifice of the said leg, into a receptacle disposed adjacent the bottle.

The accompanying drawing represents, in sectional elevation, my improved siphon in its operative position with relation to a milk bottle and a receptacle into which liquid decanted from the bottle, is discharged.

The reference character 2 designates the milk bottle containing a quantity of milk 3 and a superposed quantity of cream 4. The siphon which is preferably made of tubular glass, is composed of two divergent legs 5 and 6 of unequal length connected by an elbow 7 which when the siphon is in operation, is supported upon the rim of the bottle as is shown in the drawing.

The short leg 5 of the siphon has an outwardly flaring mouth which facilitates the inflow of fluid into which it is immerged and the other leg 6 which at its extremity is slightly curved, is provided with an integral protuberance 8, which by engagement with the exterior surface of the bottle, separates the leg therefrom and directs the fluid discharged through its orifice, into the subjacent receptacle 9.

The plunger member 10 consists of a flexible tube preferably made of rubber and in practice partially inserted into the long leg 6 of the siphon. It has at its inner extremity a circumferential enlargement 12 which by frictional engagement with the interior surface of the leg, provides a piston which serves in the operation to produce a partial vacuum in the bent portion of the siphon for the purpose of causing the liquid to overflow from the short leg thereof into the other leg.

When the siphon is placed in its operative position with relation to a milk bottle, the mouth of its short arm extends a short distance above the plane of division between the quantities of milk and cream contained in the bottle.

Inasmuch as the interior of the siphon is in continuous communication with the atmosphere through the open-ended tube 10, the cream will rise in the short arm to a point even with its level in the bottle.

When it is desired to draw the cream from the bottle, the passage of air into the conduit is discontinued by throttling the tube 10 which may be readily accomplished by pinching its portion extending exteriorly of the conduit, either with the hand or with one of the clamps commonly used for that purpose on syringes and the like. The tube is subsequently slowly withdrawn from the conduit with the result that by reason of the frictional engagement of its enlarged portion with the interior surface of the leg 6, a partial vacuum is created in the upper portion of the siphon which causes the fluid to rise in the short leg and overflow into the other through which it follows the movement of the piston until the latter has passed through the orifice of the leg when the liquid will be continuously discharged into the receptacle 9 until the level of the cream in the bottle has fallen to a point below the flaring mouth of the short leg 5 of the siphon.

Having thus described my invention what I claim and desire to secure by Letters-Patent is:

1. A siphon comprising a bent open-ended conduit, and an open-ended tube of flexible material having at one of its ends an integral enlargement in sliding contact with the interior surface of one of the legs of said conduit, the opening at the end of said leg being adapted to permit of the entire withdrawal of the tube when it is moved to incite a flow of liquid through the conduit, and the outer end of the said tube being adapted to be closed by hand for the exclusion of air from the conduit.

2. A siphon comprising a bent open-ended conduit, and an open-ended tube of flexible material having at one of its ends an enlargement in sliding contact with the interior surface of one of the legs of said conduit, the opening at the end of said leg being adapted to permit of the entire withdrawal of the tube when it is moved to incite a flow of liquid through the conduit, and the outer end of the said tube being compressible for the exclusion of air from the conduit.

3. A siphon comprising a bent open-ended conduit, and an open-ended tube of flexible material having at one of its ends an enlargement in sliding contact with the interior surface of one of the legs of said conduit, the opening at the end of said leg being adapted to permit of the entire withdrawal of the tube when it is moved to incite a flow of liquid through the conduit, and the outer end of the said tube being adapted to be closed by hand for the exclusion of air from the conduit.

In testimony whereof I have affixed my signature in presence of two witnesses.

SAMUEL B. DRINKHOUSE.

Witnesses:
G. J. ROLLANDET,
L. RHOADES.

---

Copies of this patent may be obtained for five cents each, by addressing the "Commissioner of Patents, Washington, D. C."